(12) United States Patent
Nakayama et al.

(10) Patent No.: US 8,701,301 B2
(45) Date of Patent: Apr. 22, 2014

(54) SURFACE TEXTURE MEASURING INSTRUMENT

(75) Inventors: Tatsuki Nakayama, Kure (JP); Futoshi Doi, Kure (JP)

(73) Assignee: Mitutoyo Corporation, Kanagawa (JP)

( * ) Notice: Subject to any disclaimer, the term of this patent is extended or adjusted under 35 U.S.C. 154(b) by 178 days.

(21) Appl. No.: 13/429,679

(22) Filed: Mar. 26, 2012

(65) Prior Publication Data

US 2012/0266475 A1     Oct. 25, 2012

(30) Foreign Application Priority Data

Apr. 19, 2011   (JP) ................................ 2011-092980
Apr. 19, 2011   (JP) ................................ 2011-092981

(51) Int. Cl.
  *G01B 5/20*   (2006.01)
(52) U.S. Cl.
  USPC ........................................................ 33/554
(58) Field of Classification Search
  USPC ............ 33/533, 551, 552, 553, 554, 556, 557
  See application file for complete search history.

(56) References Cited

U.S. PATENT DOCUMENTS

| | | | |
|---|---|---|---|
| 5,517,307 A | 5/1996 | Buehring et al. | |
| 6,209,217 B1 | 4/2001 | Tsuruta et al. | |
| 6,295,866 B1 | 10/2001 | Yamamoto et al. | |
| 7,328,518 B2 * | 2/2008 | Taniuchi et al. | 33/553 |
| 2002/0170196 A1 * | 11/2002 | Takemura et al. | 33/551 |
| 2003/0117633 A1 | 6/2003 | Rudolph et al. | |
| 2004/0168332 A1 * | 9/2004 | Hama et al. | 33/551 |
| 2005/0033551 A1 | 2/2005 | Takai et al. | |
| 2006/0080852 A1 * | 4/2006 | Taniuchi et al. | 33/553 |
| 2011/0005095 A1 * | 1/2011 | Nakayama et al. | 33/556 |
| 2012/0266475 A1 * | 10/2012 | Nakayama et al. | 33/558 |

FOREIGN PATENT DOCUMENTS

| | | |
|---|---|---|
| DE | 19617022 | 12/1997 |
| JP | 58-083201 | 5/1983 |
| JP | 2000-074616 | 3/2000 |
| JP | 2004-069510 | 3/2004 |
| WO | 2008/128929 | 10/2008 |

OTHER PUBLICATIONS

Search report from E.P.O., mail date is Oct. 5, 2012.
U.S. Appl. No. 13/400,893 to Tatsuki Nakayama, filed Feb. 21, 2012.

* cited by examiner

*Primary Examiner* — G. Bradley Bennett
(74) *Attorney, Agent, or Firm* — Greenblum & Bernstein, P.L.C.

(57) ABSTRACT

In a surface texture measuring instrument, a measurement arm includes: a first measurement arm that is supported by a bracket around a support shaft movably in a circular movement in a casing; and a second measurement arm having styluses that are attachably and detachably provided to an end of the first measurement arm via an attachment-detachment mechanism, the attachment-detachment mechanism being arranged in the casing. A displacement detector includes: a scale provided to the measurement arm; and a detection head provided to the bracket to face the scale. A detecting surface of the scale is on an axis of the measurement arm and on a plane of the circular movement of the measurement arm.

10 Claims, 14 Drawing Sheets

SURFACE TEXTURE MEASURING INSTRUMENT

The entire disclosure of Japanese Patent Applications No. 2011-092980 and No. 2011-092981 filed Apr. 19, 2011 is expressly incorporated by reference herein.

BACKGROUND OF THE INVENTION

1. Field of the Invention

The present invention relates to a surface texture measuring instrument. Specifically, the present invention relates to a surface texture measuring instrument including an exchangeable measurement arm having a stylus to be brought into contact with a surface of an object to be measured.

2. Description of Related Art

There has been known a surface texture measuring instrument that measures a surface texture such as a surface profile and surface roughness of an object by moving a stylus along a surface of an object to be measured while being in contact with the surface, detecting the displacement of the stylus (in a direction perpendicular to a moving direction of the stylus) caused by the surface profile or surface roughness of the object, and measuring the surface texture based on the displacement of the stylus.

Some of the surface texture measuring instrument include styluses (measurement arms) having various profiles prepared in advance and exchanged depending on profiles of measurement portions, so that measurement portions of an object having various profiles can be measured by the most suitable stylus for the profiles of the measurement portions.

For instance, Patent Literature 1 (DE19617022C1) has proposed a contour measuring instrument including: a column standing upright on a base; a holder provided on the column to be vertically movable via an adjustment instrument; a housing provided to the holder; a see-saw provided in the housing to be horizontally movable via a linear motor; a measurement arm connected to the see-saw via a connecting unit outside the housing; and a stylus provided at an end of the measurement arm, in which the measurement arm is exchangeable outside the housing.

In the aforementioned contour measuring instrument, the measurement arm is exchangeable outside the housing. Accordingly, although exchange of the measurement arm is easy, an error is likely to be caused because a detector detecting displacement of the measurement arm including the stylus to be brought into contact with an object is offset from an axis of the measurement arm and the stylus.

Moreover, since the connecting unit provided with a detachable measurement arm is disposed outside the housing, when external force acts on the measurement arm and the stylus to detach the measurement arm from the connecting unit, the measurement arm is likely to fall. In such a case, the measurement arm and the stylus may be damaged. Furthermore, since the connecting unit is exposed outside the housing, the connecting unit may interfere with the object in measurement to be damaged and easily becomes dirty depending on external environment in which the connecting unit is used.

Moreover, in the surface texture measuring instrument such as the aforementioned contour measuring instrument, it is required to adjust pressure (i.e., measurement force), by which the stylus is brought into contact with the surface of the object, to the most suitable measurement force for a material and a profile of the object.

In general, when the measurement arm is exchanged, a weight of an exchanged measurement arm is often different from a weight of the original measurement arm, whereby the exchanged measurement arm becomes off balance to cause an error in measurement. For this reason, at each time of the exchange of the measurement arm, balance of the measurement arm needs to be adjusted to keep the measurement arm substantially horizontal, before the measurement force is adjusted.

Typically, a measuring force adjusting mechanism needs to be adjusted after the exchange of the measurement arm. Specifically, the stylus at the end of the measurement arm is put on a measuring instrument for measuring force (e.g., an electronic scale), and while keeping this condition, the measuring force adjusting mechanism is adjusted such that a value displayed on the measuring instrument is 0. Accordingly, the aforementioned surface texture measuring instrument shows a poor usability and a poor operational efficiency.

SUMMARY OF THE INVENTION

An object of the invention is to provide a surface texture measuring instrument to solve the above problem which is highly accurate and capable of reducing dirtiness and damage of a stylus, a measurement arm and the like, and is expected to improve usability and operational efficiency by automatically adjusting balance of the measurement arm even when the measurement arm is exchanged.

According to an aspect of the invention, a surface texture measuring instrument comprising: a measurement arm that is supported by a body movably in a circular movement around a rotary shaft; a stylus provided at an end of the measurement arm; a displacement detector that detects a circular movement amount of the measurement arm; a detector having a casing that houses the body; a stage on which an object to be measured is mounted; and a relative movement mechanism that moves the detector and the stage relatively to each other, the surface texture measuring instrument being configured to detect the circular movement amount of the measurement arm by the displacement detector while moving the detector and the stage relatively to each other by the relative movement mechanism with the stylus being in contact with a surface of the object and to measure a surface texture of the object based on the circular movement amount, wherein the measurement arm comprises: a first measurement arm that is supported by the body swingably around the support shaft in the casing; and a second measurement arm that is provided with the stylus at an end thereof and is detachably provided to an end of the first measurement arm via an attachment-detachment mechanism, the attachment-detachment mechanism being arranged in the casing, the displacement detector comprises: a scale that is provided to one of the body and the measurement arm; and a detection head that is provided to the other of the body and the measurement arm to face the scale, and a detecting surface of the scale is on an axis of the measurement arm and on a plane of the circular movement of the measurement arm.

With this arrangement, since the displacement detector includes the scale and the detection head, and the detecting surface of the scale is on the axis of the measurement arm and on the plane of the circular movement of the measurement arm, errors caused by offset and the like can be reduced and a highly accurate measurement can be expected.

Moreover, since the second measurement arm having the stylus at the end thereof is detachably provided to the measurement arm via the attachment-detachment mechanism, the measurement can be performed by exchanging the second measurement arm for another second measurement arm having the most suitable stylus for the profiles of the measurement portions of the object.

With this arrangement, the attachment-detachment mechanism is provided in the casing. Accordingly, even when external force acts on the measurement arm and the stylus to detach the measurement arm from the attachment-detachment mechanism, the measurement arm is less likely to fall. Consequently, damage to the measurement arm and the stylus can be prevented. Since the attachment-detachment mechanism is arranged in the casing, the attachment-detachment mechanism does not collide with the object, so that the attachment-detachment mechanism is less likely to be damaged by collision with the object and is less likely to be dirty by external environments.

Since the attachment-detachment mechanism is arranged in the casing, in other words, the attachment-detachment mechanism is closer to the fulcrum of the measurement arm, moment applied on the fulcrum can be reduced in the attachment/detachment of the measurement arm. Accordingly, load applied on a bearing at the fulcrum can be reduced and damage prevention effect to the bearing can be expected.

In the surface texture measuring instrument according to the above aspect of the invention, it is preferable that the attachment-detachment mechanism includes: a first plate that is attached to the end of the first measurement arm; a second plate that is attached to a base end of the second measurement arm; a positioning mechanism that positions the second plate at a predetermined position relative to the first plate when placing the second plate to face the first plate; a magnet provided on one of the first plate and the second plate; and a magnetic material that is provided on the other of the first plate and the second plate and is attracted by the magnet, the positioning mechanism includes: a first seat including a pair of cylindrical positioning members that are arranged in parallel to an axial direction of the measurement arm and are spaced from each other at a predetermined interval; a second seat including a pair of cylindrical positioning members that are arranged in parallel to the axial direction of the measurement arm and are spaced from the first seat in the axial direction of the measurement arm; a third seat including a pair of cylindrical positioning members that are perpendicular to the axial direction of the measurement arm and are spaced from each other at a predetermined interval; and engagement balls that respectively correspond to the first seat, the second seat and the third seat to be engageable with and disengageable from the first seat, the second seat and the third seat, and the first seat, the second seat and the third seat are provided on one of the first plate and the second plate and the engagement balls are provided on the other of the first plate and the second plate.

With this arrangement, since the attachment-detachment mechanism is arranged in the casing, it becomes difficult to visually check whether the measurement arm is properly attached during the exchange of the measurement arm.

With this arrangement, when the second plate is placed to face the first plate such that the first plate and the second plate substantially coincide with each other, the magnetic material becomes attracted by the magnet, whereby the second plate becomes attracted by the first plate. With this arrangement, the positioning mechanism, which positions the second plate at a predetermined position relative to the first plate, includes: the first, second and third seats each including a pair of cylindrical positioning members in parallel to each other and spaced from each other at a predetermined interval; and the engagement balls corresponding to the first, second and third seats. Accordingly, each of the engagement balls is fit into a right position between the pair of cylindrical positioning members for each seat while being guided by the pair of cylindrical positioning members. Even without visual check, the measurement arm can be properly exchanged by a one-touch operation in which the second plate is placed to face the first plate such that the first plate and the second plate substantially coincide with each other.

Under the condition that the second plate is attracted by the first plate, the third seat restricts an axial displacement of the measurement arm and the first and second seats restrict a rotary displacement of the measurement arm around the engagement ball engaged with the third seat. Accordingly, the first and second plates can accurately be positioned in a predetermined relation. Moreover, under this condition, since the first seat is spaced from the second seat in the axial direction of the measurement arm, the measurement arm can be held by a relatively compact arrangement and a small force.

When an external force larger than the attraction force of the magnet is applied on the stylus and the measurement arm during the measurement, the first plate and the second plate are disengaged. Accordingly, further external force does not act on the stylus, the measurement arm and an inner mechanism of the detector, so that damage to these components can be prevented.

In the surface texture measuring instrument according to the above aspect of the invention, it is preferable that the positioning mechanism includes: at least two engagement holes formed on one of the first plate and the second plate; and at least two engagement pins provided on the other of the first plate and the second plate to be engaged with the engagement holes.

With this arrangement, when the second plate is placed to face the first plate, the engagement pins formed on one of the first and second plates are engaged with the engagement holes formed on the other of the first and second plates, so that the first and second plates are reliably connectable.

Moreover, during the measurement, even when external force larger than the attraction force of the magnet is applied on the stylus and the measurement arm to cause the first and second plates to be disengaged, the engagement pins are caught in the engagement holes, so that the first and second plates are difficult to be disengaged.

In the surface texture measuring instrument according to the above aspect of the invention, it is preferable that a projecting amount of each of the engagement pins is set such that the magnetic material is attracted by the magnet after the engagement pins start to be engaged with the engagement holes.

With this arrangement, the projecting amount of each of the engagement pins is set such that the magnetic material becomes attracted by the magnet after the engagement pins start to be engaged with the engagement holes when the second plate is placed to face the first plate. Accordingly, even without visual check, it can be recognized by feeling through the attraction force of the magnet that the second plate is connected to the first plate at a right position.

In the surface texture measuring instrument according to the above aspect of the invention, it is preferable that the pairs of cylindrical positioning members for the first, second and third seats and the engagement balls are formed of a conductive material and provide seat sensors that are closed when the pairs of cylindrical positioning members are respectively in contact with the engagement balls engageable and disengageable thereto and are opened when the pairs of cylindrical positioning members are respectively separated from the engagement balls, and a contact detection circuit that detects opening and closing of the seat sensors is provided.

With this arrangement, the contact detection circuit can detect the opening/closing of the seat sensors. Accordingly, it can be checked whether the measurement arm has been suitably exchanged in the exchange of the measurement arm. Moreover, since it can be judged that the measurement arm drops off during the measurement, the measurement operation can be accurately performed.

In the surface texture measuring instrument according to the above aspect of the invention, it is preferable that a drive stopper that stops driving the relative movement mechanism when the contact detection circuit detects opening of any one of the seat sensors.

With this arrangement, driving of the relative movement mechanism is stopped by the drive stopper when the contact detection circuit detects the opening of any one of the seat sensors. For instance, even when the measurement arm is detached from the attachment-detachment mechanism, the driving of the relative movement mechanism is stopped, so that the measurement can safely be performed.

According to another aspect of the invention, a surface texture measuring instrument includes: a measurement arm that is supported by a body movably in a circular movement around a rotary shaft; a stylus provided at an end of the measurement arm; a displacement detector that detects an circular movement amount of the measurement arm; a detector having a measurement force applier that applies a measurement force to the stylus by biasing the measurement arm in circular movement directions; a stage on which an object to be measured is mounted; and a relative movement mechanism that moves the detector and the stage relatively to each other, the surface texture measuring instrument being configured to detect the circular movement amount of the measurement arm by the displacement detector while moving the detector and the stage relatively to each other by the relative movement mechanism with the stylus being in contact with a surface of the object and to measure a surface texture of the object based on the circular movement amount, in which the measurement arm includes: a first measurement arm that is supported by the body movably in the circular movement around the support shaft; and a second measurement arm that is provided with the stylus at an end thereof and is detachably provided to an end of the first measurement arm via an attachment-detachment mechanism, the measurement force applier includes a voice coil that biases the measurement arm in the circular movement directions around the support shaft, and a balance adjuster that adjusts electric current passing through the voice coil to adjust balance of the measurement arm, after the second measurement arm is exchanged.

With this arrangement, the measurement arm includes: the first measurement arm that is supported by the body movably in the circular movement around the support shaft; and the second measurement arm that is detachable to the end of the first measurement arm via the attachment-detachment mechanism and includes the stylus at the end thereof, in which the second measurement arm having the stylus is exchangeable. Accordingly, the measurement can be performed by a measurement arm having the most suitable stylus for the profiles of the measurement portions of the object.

Here, after the second measurement arm is exchanged, even when a weight of the exchanged second measurement arm is different from a weight of the previous second measurement arm, the balance adjuster can automatically adjust the balance of the measurement arm by adjusting the electric current passing through the voice coil. Accordingly, measurement errors caused by the exchange of the measurement arm can be decreased and improvement in usability and an operational efficiency can be expected.

In the surface texture measuring instrument according to the above aspect of the invention, it is preferable that the balance adjuster adjusts the electric current passing through the voice coil while monitoring the circular movement amount of the measurement arm detected by the displacement detector and terminates the balance adjustment when the circular movement amount of the measurement arm reaches a predetermined value.

With this arrangement, the balance adjuster adjusts the electric current passing through the voice coil while monitoring the circular movement amount of the measurement arm detected by the displacement detector and terminates the balance adjustment when the circular movement amount reaches the predetermined value. Accordingly, the balance adjustment of the measurement arm can be accurately performed.

In the surface texture measuring instrument according to the above aspect of the invention, it is preferable that the stylus includes a pair of styluses projecting from the end of the measurement arm in the circular movement directions, and the voice coil configures a measurement-arm attitude switching mechanism that switches an attitude of the measurement arm between a first attitude where the measurement arm is biased in one direction of the circular movement directions and a second attitude where the measurement arm is biased in the other direction of the circular movement directions.

With this arrangement, the pair of styluses are provided at the end of the measurement arm and project in the circular movement directions. Accordingly, surface textures of the upper and lower surfaces of the hole and surface textures of the upper and lower surfaces of a plate-like object can be measured by switching the biasing direction of the measurement arm by the measurement-arm attitude switching mechanism, specifically, switching the attitude of the measurement arm between one direction of the circular movement directions of the measurement arm to the other direction thereof.

In the surface texture measuring instrument according to the above aspect of the invention, it is preferable to further include a speed control mechanism that controls a switching operation speed of the measurement arm to be a predetermined speed when the measurement-arm attitude switching mechanism switches the attitude of the measurement arm.

With this arrangement, when the attitude of the measurement arm is switched from one direction (e.g., an upward direction) of the circular movement directions to the other direction (e.g., a downward direction), the switching operation speed of the measurement arm is controlled to be a predetermined speed by the speed control mechanism, thereby being kept at a predetermined speed or lower. Accordingly, for instance, in measuring an inner surface of a hole, impact when the stylus collides with the inner surface can be suppressed, thereby decreasing damage to the stylus or the object.

DETAILED DESCRIPTION OF PREFERRED EMBODIMENT

Description of Surface Texture Measuring Instrument (Reference to FIGS. 1 to 8)

Figure 1:
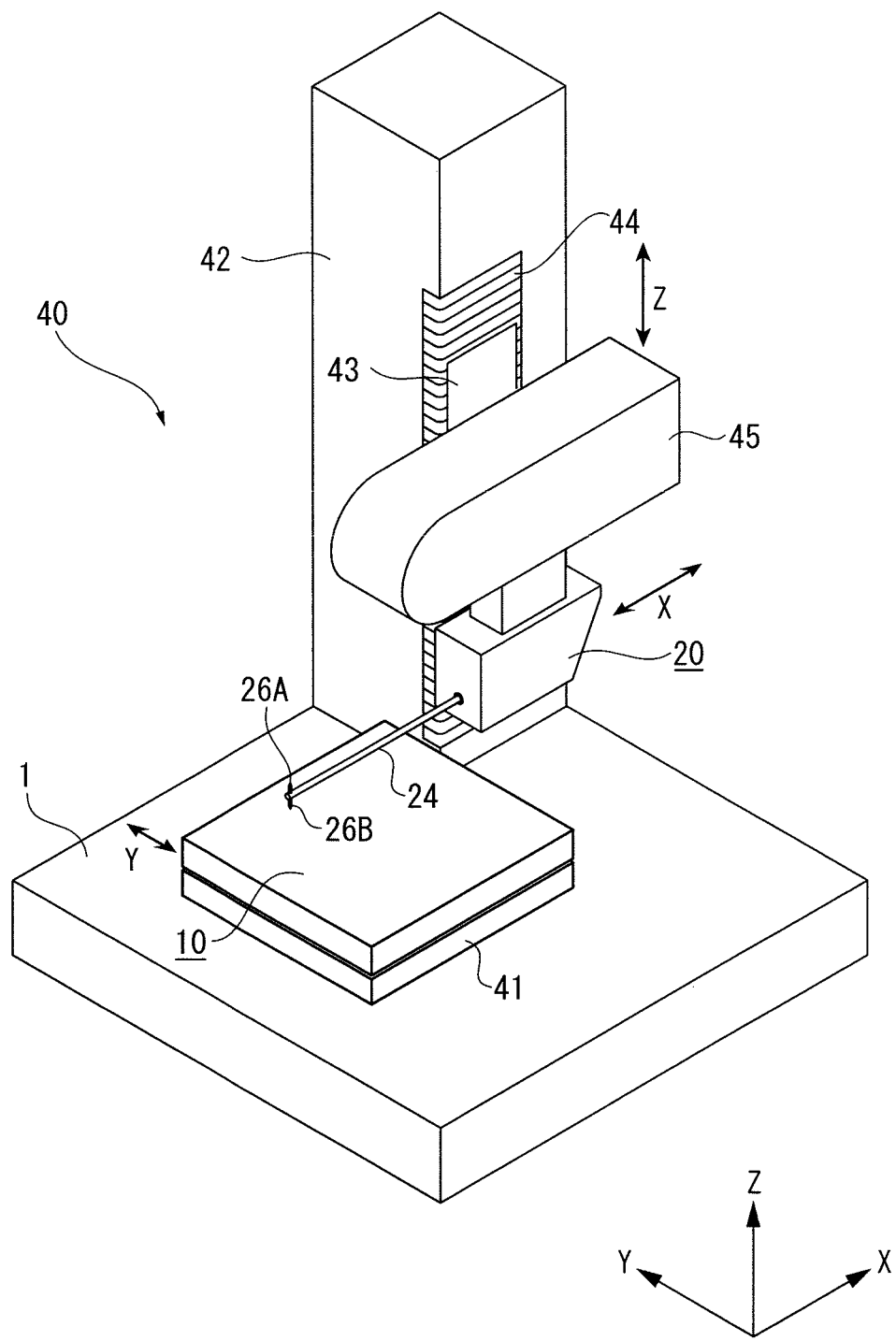
FIG. 1 is a perspective view showing a surface texture measuring instrument according to an exemplary embodiment of the invention.

As shown in FIG. 1, a surface texture measuring instrument according to an exemplary embodiment of the invention includes: a base 1; a stage 10 that is mounted on the base 1 and has an upper surface on which an object to be measured is mounted; a stylus-displacement detector 20 having styluses 26A and 26B that are brought into contact with a surface of the object; and a relative movement mechanism 40 that enables relative movement between the stylus-displacement detector 20 and the stage 10.

The relative movement mechanism 40 includes: a Y-axis driving mechanism 41 that is located between the base 1 and the stage 10 and moves the stage 10 in a horizontal direction (Y-axis direction); a column 42 that stands upright from an upper surface of the base 1; a Z-slider 43 that is provided to the column 42 movably in a vertical direction (Z-axis direction); a Z-axis driving mechanism 44 that moves the Z-slider 43 in the vertical direction; and an X-axis driving mechanism 45 that is provided to the Z-slider 43 and moves the stylus-displacement detector 20 in a direction (X-axis direction) perpendicular to the moving direction of the stage 10 (Y-axis direction) and the moving direction of the Z-slider 43 (Z-axis direction). Accordingly, the relative movement mechanism 40 is provided by a three-dimensional movement mechanism including the Y-axis driving mechanism 41 that moves the stage 10 in the Y-axis direction, the Z-axis driving mechanism 44 that moves the stylus-displacement detector 20 and the X-axis driving mechanism 45 that moves the stylus-displacement detector 20 in the X-axis direction.

Each of the Y-axis driving mechanism 41 and the Z-axis driving mechanism 44 is provided by, for instance, a feed screw mechanism (not shown) that includes a ball screw shaft and a nut member screwed to the ball screw shaft.

Figure 2:
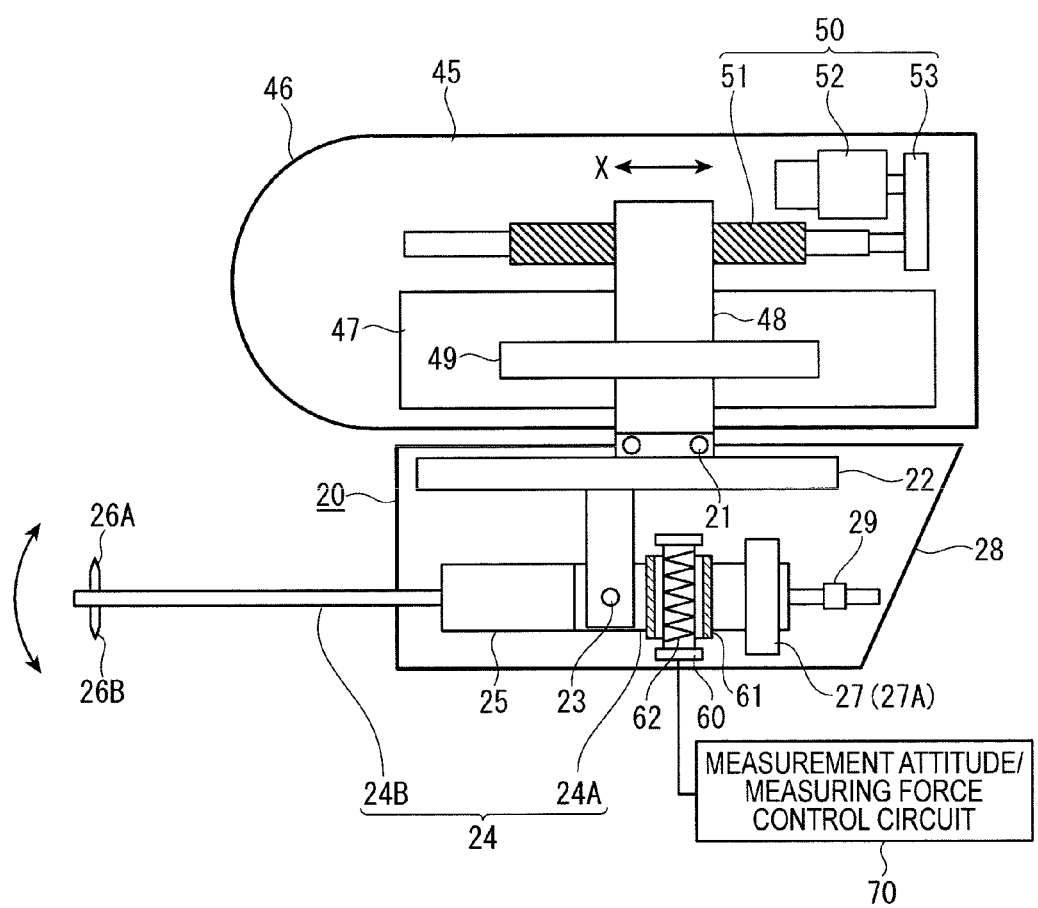
FIG. 2 shows an X-axis driving mechanism and a stylus-displacement detector according to the exemplary embodiment.

As shown in FIG. 2, the X-axis driving mechanism 45 includes: a driving mechanism body 46 that is fixed to the Z-slider 43; a guide rail 47 that is provided to the driving mechanism body 46 in parallel to the X-axis direction; an X-slider 48 that is movable in the X-axis direction along the guide rail 47; an X-axis position detector 49 that detects a position of the X-slider 48 in the X-axis direction; and a feed mechanism 50 that moves the X-slider 48 along the guide rail 47.

The feed mechanism 50 includes: a feed screw shaft 51 that is provided to the driving mechanism body 46 in parallel to the guide rail 47; a motor 52 (driving source); and a rotation transmitting mechanism 53 that transmits rotation of the motor 52 to the feed screw shaft 51. The rotation transmitting mechanism 53 is provided by a mechanism such as a gear train, a belt or a pulley.

As shown in FIG. 2, the stylus-displacement detector 20 includes: a bracket 22 (a body) that is detachably suspended from the X-slider 48 via a bolt 21 and is supported by the X-slider 48; a measurement arm 24 that is supported by the bracket 22 swingably in the vertical direction (movably in a circular movement) around a rotary shaft 23 (a support shaft); a pair of styluses 26A and 26B provided at an end of the measurement arm 24; a displacement detector 27 that detects a circular movement amount (displacement in the Z-axis direction) of the measurement arm 24; a counterweight 29 that is adjustably positioned on the measurement arm 24; a measurement-arm attitude switching mechanism 60 that switches an attitude of the measurement arm 24 between a first attitude where the measurement arm 24 is biased in one direction (the upward direction) of the circular movement and a second attitude where the measurement arm 24 is biased in the other direction (the downward direction) of the circular movement; and a casing 28 that houses the bracket 22, the measurement arm 24, the displacement detector 27, the counterweight 29 and the measurement-arm attitude switching mechanism 60.

The measurement arm 24 includes: a first measurement arm 24A that is supported by the bracket 22 movably in a vertical direction of the circular movement around the rotary shaft 23; and a second measurement arm 24B that is exchangeably attached to an end of the first measurement arm 24A via an attachment-detachment mechanism 25. The attachment-detachment mechanism 25 connects the first measurement arm 24A to the second measurement arm 24B in alignment with each other.

The styluses 26A and 26B project from the second measurement arm 24B in circular movement directions. In other words, the stylus 26A projects perpendicularly upward from the second measurement arm 24B and the stylus 26B projects perpendicularly downward from the second measurement arm 24B.

Figure 3:
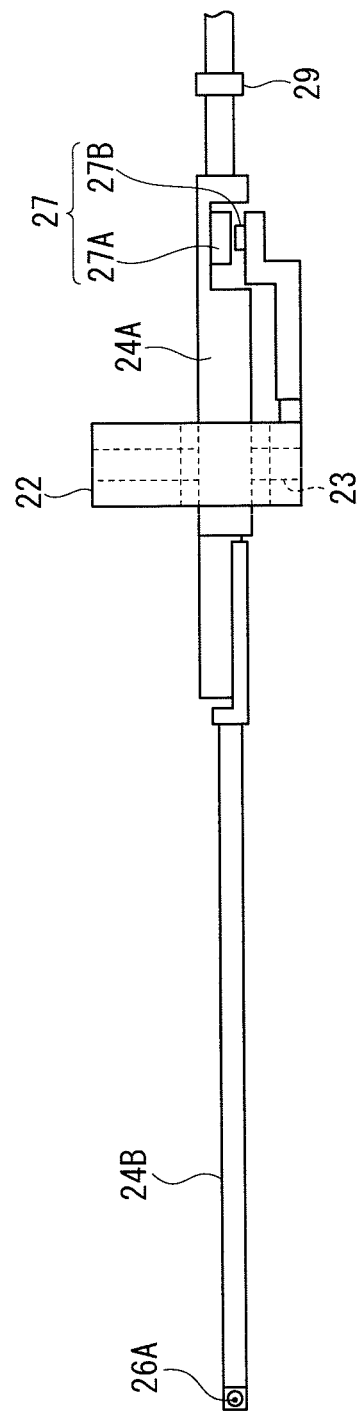
FIG. 3 is a plan view showing a relationship between a measurement arm and a displacement detector according to the exemplary embodiment.

As shown in FIG. 3, the displacement detector 27 is provided along a range of the circular movement and includes a position detector that outputs pulse signals of a number corresponding to the circular movement amount of the measurement arm 24. Specifically, the displacement detector 27 includes a scale 27A that is provided to the measurement arm 24 and is curved in the circular movement directions of the measurement arm 24; and a detection head 27B that is attached to the bracket 22 (the body) to face the scale 27A. A detecting surface of the scale 27A is on the axis of the measurement arm 24 and on a plane of the circular movement of the measurement arm 24. This arrangement allows the detecting surface of the scale 27A, the measurement arm 24 and ends of the styluses 26A and 26B to be coaxially located.

A position of the counterweight 29 is adjustable in the axial direction of the measurement arm 24 such that the weight on a side of the first measurement arm 24A and the weight on a side of the second measurement arm 24B are balanced around the rotary shaft 23. Specifically, the counterweight 29 is fixed to the measurement arm 24 at a desired position by a setscrew. Alternatively, the measurement arm 24 may be externally threaded to provide a male thread. The counterweight 29 may be screwed to the male thread so as to adjust its position.

Figure 4:
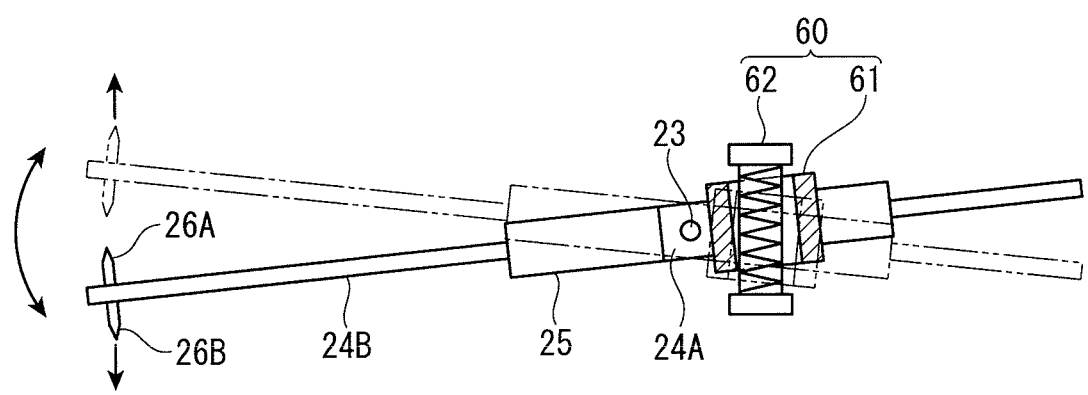
FIG. 4 shows the measurement arm and a measurement-arm attitude switching mechanism according to the exemplary embodiment.

As shown in FIG. 4, the measurement-arm attitude switching mechanism 60 includes: a cylindrical magnet 61 in the middle of the first measurement arm 24A; and a voice coil 62 that is fixed to the bracket 22 (the body) to penetrate the magnet 61 and biases the measurement arm 24 in one direction (the upward direction) of the circular movement around the rotary shaft 23 and in the other direction (the downward direction) thereof. The measurement-arm attitude switching mechanism 60 is controlled by a command from a measurement attitude/measuring force control circuit 70. When electric current flows into the voice coil 62 by the command of the measurement attitude/measuring force control circuit 70, the magnet 61 of the measurement arm 24 is attracted by the voice coil 62 by an electromagnetic force generated by the voice coil 62 and a magnetic force of the magnet 61, so that an attitude of the measurement arm 24 is switched to an attitude where the end of the measurement arm 24 is biased upward or to an attitude where the end of the measurement arm 24 is biased downward.

The measurement-arm attitude switching mechanism 60 includes the voice coil 62 biasing the measurement arm 24 in the circular movement directions around the rotary shaft 23 (the fulcrum) and also serves as a measurement force applier that applies a measurement force to the styluses 26A and 26B by biasing the measurement arm 24 in the circular movement directions.

Figure 5:
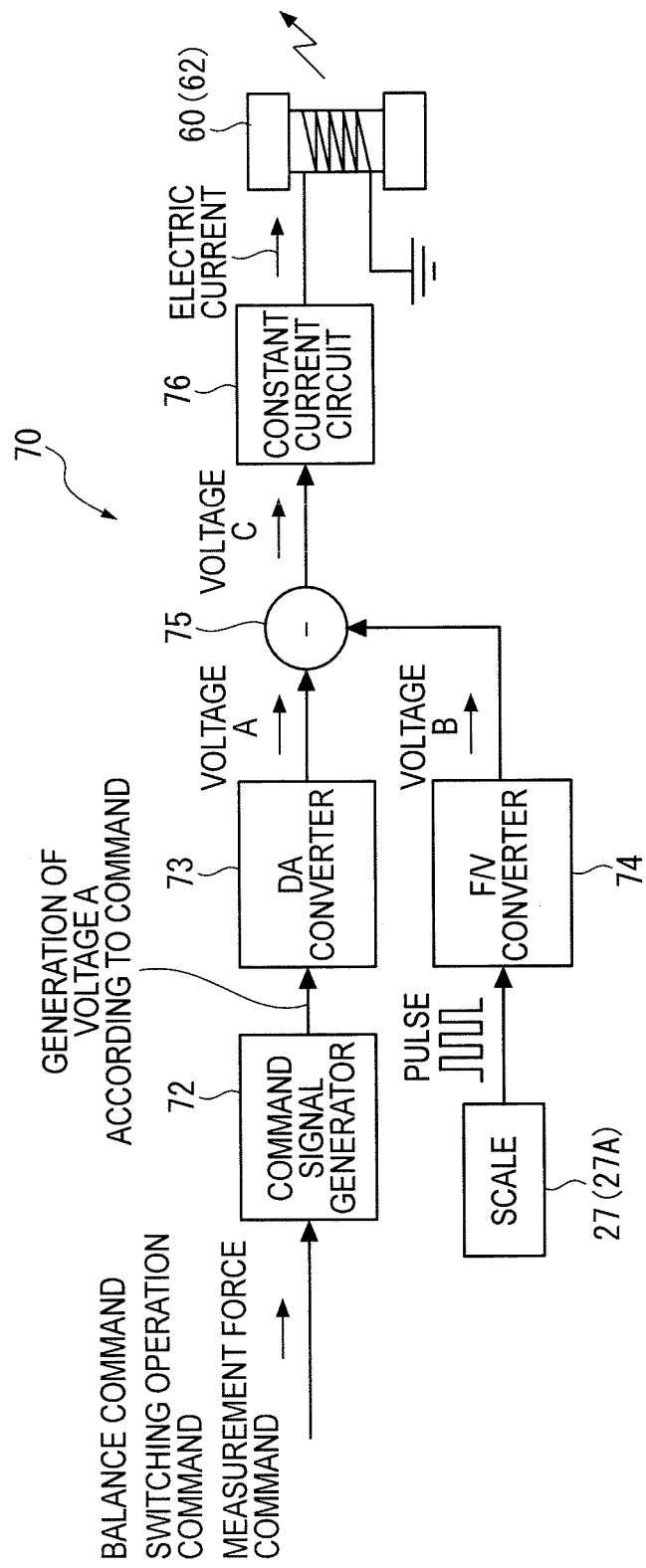
FIG. 5 shows a measurement attitude/measuring force control circuit according to the exemplary embodiment.

As shown in FIG. 5, the measurement attitude/measuring force control circuit 70 as a speed control mechanism includes: a command signal generator 72 that is provided by CPU and the like and generates a voltage A (a command speed signal) corresponding to a predetermined speed in accordance with a balance command, a switching operation command (an upward switching operation command or a downward switching operation command) and a measurement force command which are outputted from a later-described controller 101; a digital/analog converter 73 that converts the voltage A (a digital signal) from the command signal generator 72 to an analog signal; a frequency/voltage converter 74 as a measurement-arm speed detector that outputs a voltage B (operation speed signal) corresponding to an operation speed of the measurement arm 24 based on a pulse signal (frequency) from the displacement detector 27; a subtractor 75 as a difference output unit that outputs a differential voltage C as a difference between the command speed signal (the voltage A) and the operation speed signal (the voltage B); and a constant current circuit 76 that converts the differential voltage C from the subtractor 75 to electric current and supplies the electric current to the voice coil 62 of the measurement-arm attitude switching mechanism 60. With this arrangement, the circular movement of the measurement arm 24 can be performed while the operation speed of the measurement arm 24 is kept at a predetermined speed or lower.

Here, the voltage A (command speed signal) generated from the command signal generator 72 is set at a speed such that the styluses 26A and 26B or the object are not damaged when the styluses 26A and 26B are brought into contact with the object.

Figure 6:
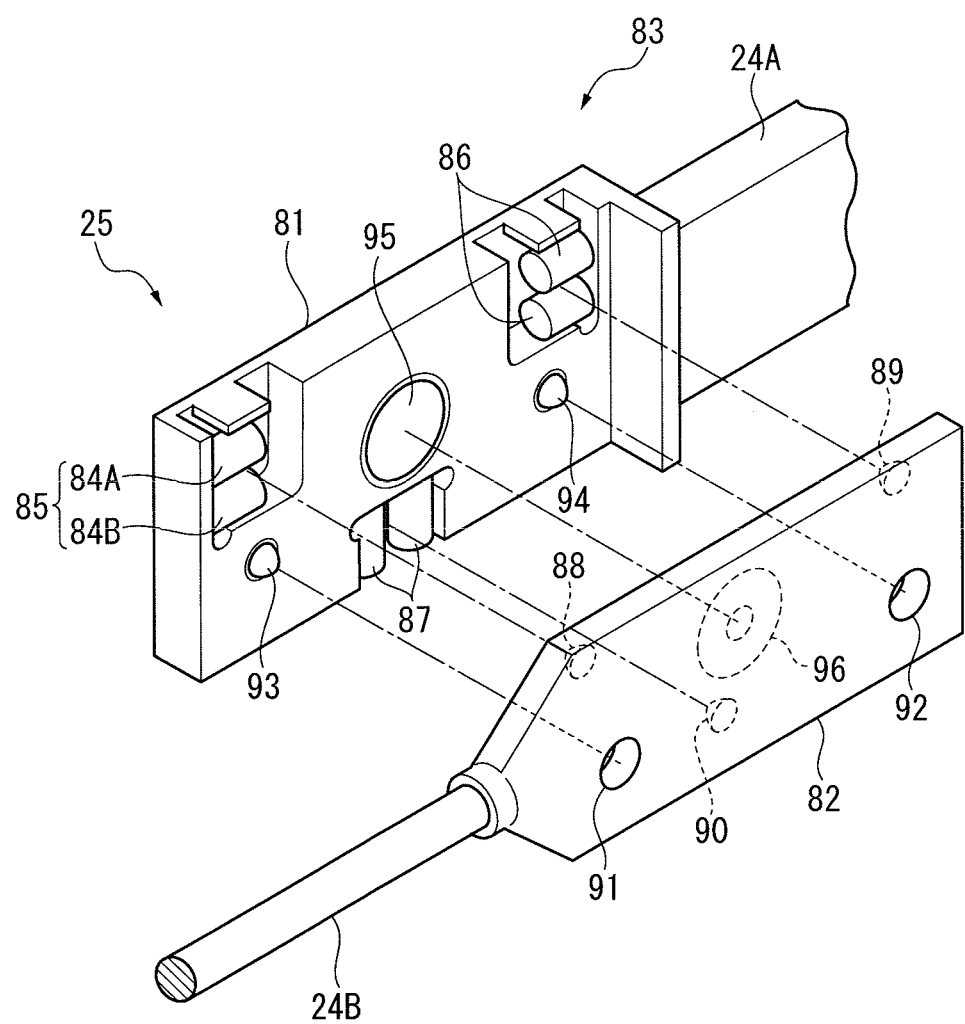
FIG. 6 is an exploded perspective view showing an attachment-detachment mechanism according to the exemplary embodiment.

As shown in FIG. 2, the attachment-detachment mechanism 25 is disposed in the casing 28. As shown in FIG. 6, the attachment-detachment mechanism 25 includes: a rectangular first plate 81 that is provided to the end of the first measurement arm 24A; a rectangular second plate 82 that is provided to a base end of the second measurement arm 24B; a positioning mechanism 83 that positions the second plate 82 at a predetermined position relative to the first plate 81 when placing the second plate 82 to face the first plate 81; a magnet 95 provided on the first plate 81; and a magnetic material 96 that is provided on the second plate 82 and is attracted by the magnet 95.

The positioning mechanism 83 includes: a first seat 85 including a pair of cylindrical positioning members 84A and 84B that are arranged in parallel to the axial direction of the measurement arm 24 and are spaced from each other at a predetermined interval; a second seat 86 including a pair of cylindrical positioning members 84A and 84B that are arranged in parallel to the axial direction of the measurement arm 24 and are spaced from the first seat 85 in the axial direction of the measurement arm 24; a third seat 87 including a pair of cylindrical positioning members 84A and 84B that are perpendicular to the axial direction of the measurement arm 24 and are spaced from each other at a predetermined interval; engagement balls 88, 89 and 90 that respectively correspond to the first seat 85, the second seat 86 and the third seat 87 to be respectively engageable with and disengageable from the first seat 85, the second seat 86 and the third seat 87; at least two engagement holes 91 and 92; and at least two engagement pins 93 and 94 that are respectively engaged with the engagement holes 91 and 92.

The first seat 85, the second seat 86, the third seat 87 and the engagement pins 93 and 94 are arranged on the first plate 81. Specifically, the first seat 85 and the second seat 86 are arranged on both ends of the first plate 81 that are spaced in the axial direction of the measurement arm 24. The third seat 87 is arranged lower than and between the first seat 85 and the second seat 86. The engagement pins 93 and 94 are respectively arranged beneath the first seat 85 and the second seat 86. The magnet 95 is surrounded by the first, second and third seats 85, 86 and 87.

The engagement balls 88, 89 and 90 and the engagement holes 91 and 92 are arranged on the second plate 82. In other words, when the second plate 82 is positioned at a predetermined position relative to the first plate 81; the engagement balls 88, 89 and 90 are arranged to respectively correspond to the first, second and third seats 85, 86 and 87 of the first plate 81; the engagement holes 91 and 92 are arranged to respectively correspond to the engagement pins 93 and 94; and the magnetic material 96 is arranged to correspond to the magnet 95.

Figure 7:
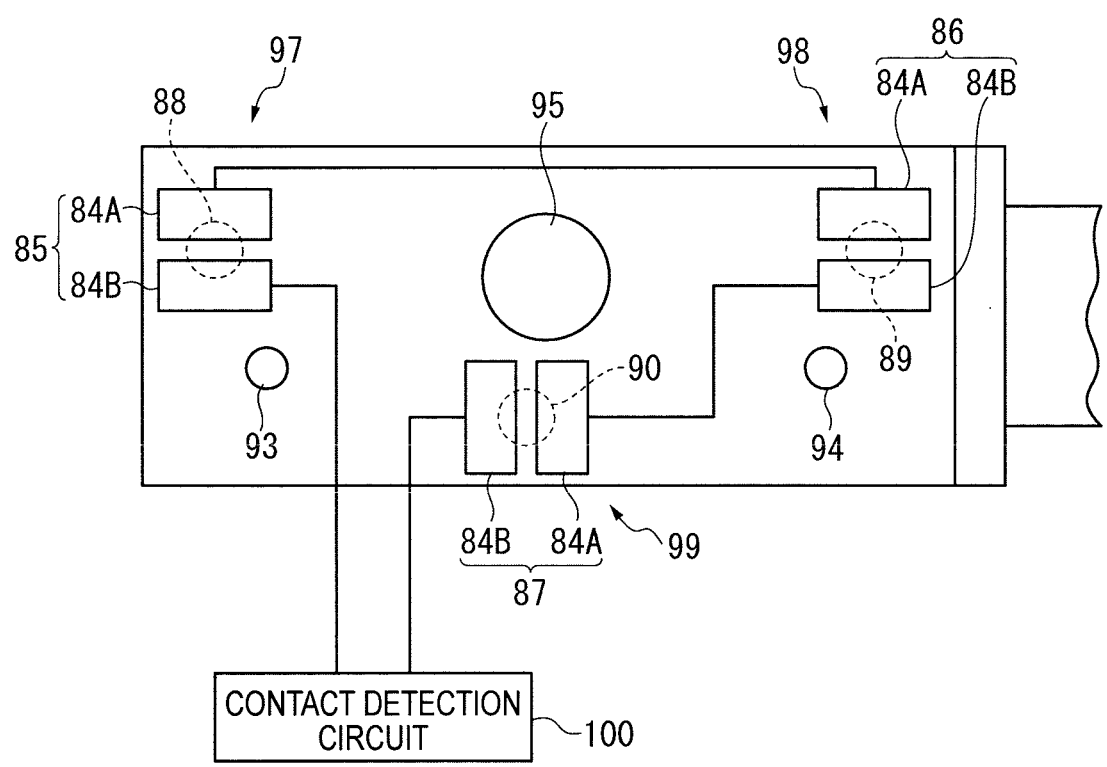
FIG. 7 shows a contact detection circuit according to the exemplary embodiment.

When the second plate 82 is positioned at the predetermined position relative to the first plate 81, the engagement balls 88, 89 and 90 are arranged to fit between the respective cylindrical positioning members 84A and 84B while being in contact therewith. The pairs of cylindrical positioning members 84A and 84B for the first, second and third seats 85, 86 and 87 and the engagement balls 88, 89 and 90 are formed of a conductive material. As shown in FIG. 7, seat sensors 97, 98 and 99 are configured such that the seat sensors 97, 98 and 99 are closed when the pairs of cylindrical positioning members 84A and 84B for the first, second and third seats 85, 86 and 87 are in contact with the engageable/disengageable engagement balls 88, 89 and 90 while the seat sensors 97, 98 and 99 are opened when the pairs of cylindrical positioning members 84A and 84B are separated from the engagement balls 88, 89 and 90. The seat sensors 97, 98 and 99 are connected to each other in series and connected to a contact detection circuit 100.

The contact detection circuit 100 detects opening/closing of the seat sensors 97, 98 and 99 and notifies the opening/closing by ON/OFF of a lamp, display on a display section or a sound of a buzzer or the like.

A projecting amount of each of the engagement pins 93 and 94 is set such that the magnetic material 96 is attracted by the magnet 95 after the engagement pins 93 and 94 start to be engaged with the engagement holes 91 and 92.

Figure 8:
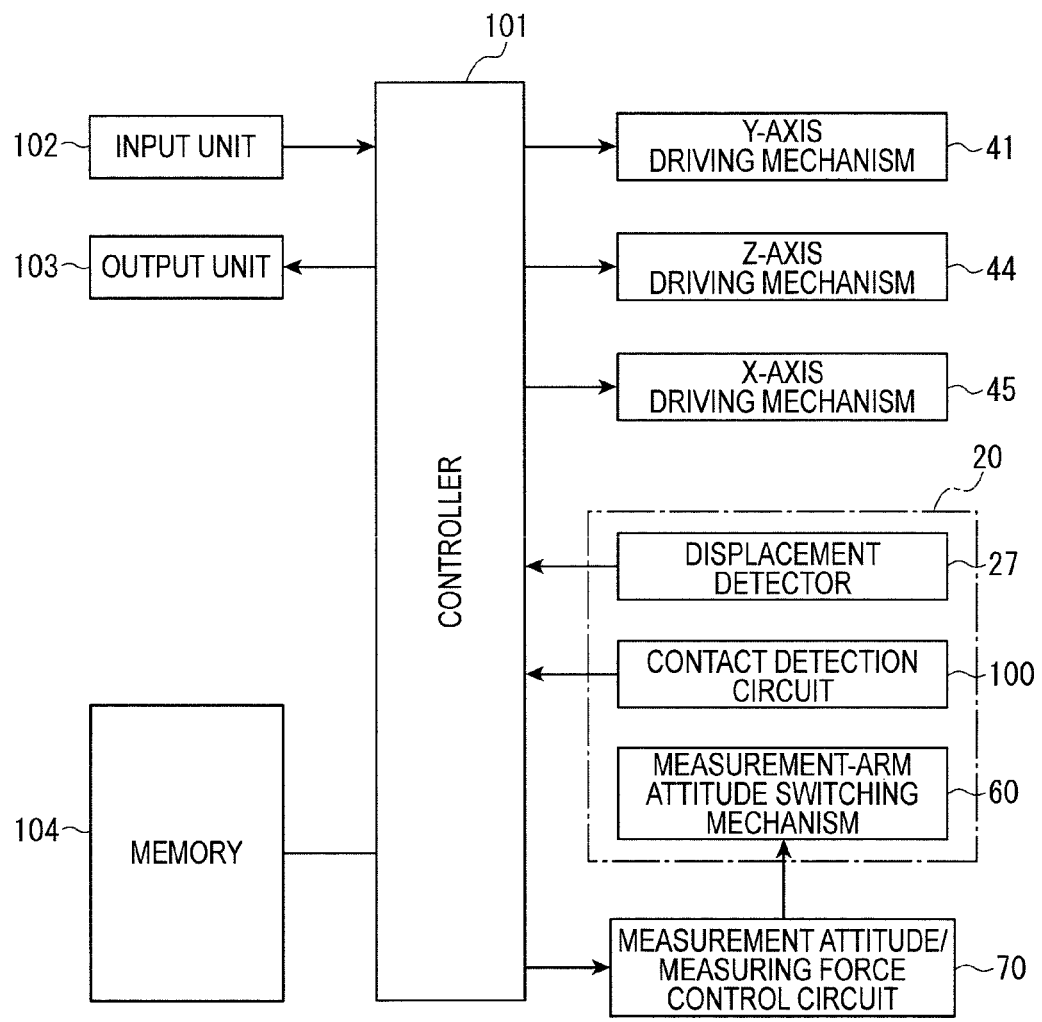
FIG. 8 is a block diagram showing a control system according to the exemplary embodiment.

FIG. 8 shows a control system of the surface texture measuring instrument according to the exemplary embodiment. The controller 101 is connected with the Y-axis driving mechanism 41, the Z-axis driving mechanism 44, the X-axis driving mechanism 45, the displacement detector 27, the contact detection circuit 100, the measurement-arm attitude switching mechanism 60, an input unit 102, an output unit 103 and a memory 104, in which the displacement detector 27, the contact detection circuit 100, the measurement-arm attitude switching mechanism 60 provides the stylus-displacement detector 20, and the measurement-arm attitude switching mechanism 60 is connected to the controller 101 via the measurement attitude/measuring force control circuit 70.

The controller 101 is configured to serve as a drive stopper that stops driving the relative movement mechanism 40 (the Y-axis driving mechanism 41, the Z-axis driving mechanism 44 and the X-axis driving mechanism 45) when the contact detection circuit 100 detects opening of any one of the seat sensors 97, 98 and 99. The controller 101 is configured to also serve as a balance adjuster that adjusts balance of the measurement arm 24 by adjusting the electric current passing through the voice coil 62 of the measurement-arm attitude switching mechanism 60 after the second measurement arm 24B is exchanged. Specifically, the controller 101 is configured to serve as the balance adjuster that adjusts the electric current passing through the voice coil 62 while monitoring the circular movement amount of the measurement arm 24 detected by the displacement detector 27 and terminates the balance adjustment when the circular movement amount reaches a predetermined value.

Description of Measurement Method

For Measurement of Upper and Lower Surfaces of Inner Surface of Hole

Figure 9:
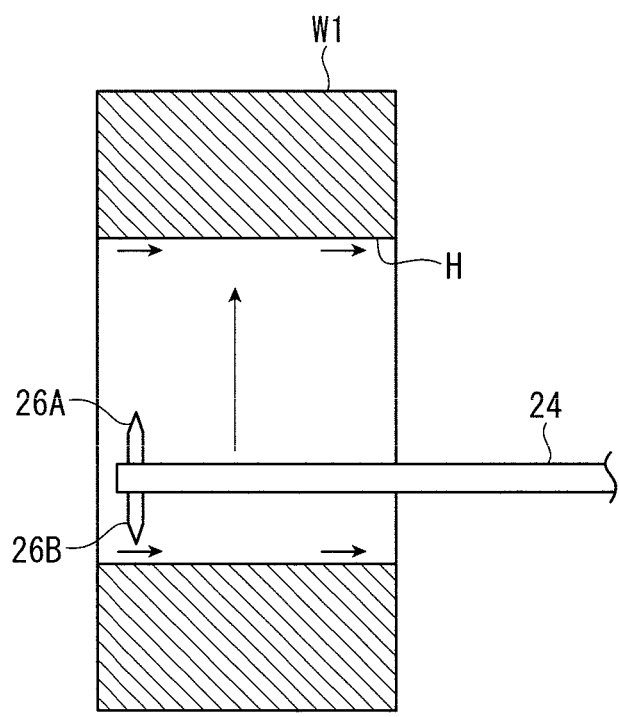
FIG. 9 shows an example of measurement of upper and lower surfaces of an inner surface of a hole according to the exemplary embodiment.

For instance, for measuring a lower surface and an upper surface of an inner surface of a hole H of an object W1 as shown in FIG. 9, the relative movement mechanism 40 is driven to position the styluses 26A and 26B of the measurement arm 24 in the hole H of the object W1, and then, a downward switching operation command and a measurement force command are outputted from the controller 101. Hereupon, the end of the measurement arm 24 is biased downward by the measurement attitude/measuring force control circuit 70 and the electric current according to the measurement force command is supplied to the voice coil 62 of the measurement-arm attitude switching mechanism 60.

Accordingly, the measurement arm 24 is operated at the predetermined speed in a direction by the measurement-arm attitude switching mechanism 60 to bias the end of the measurement arm 24, for instance, downward and the downward stylus 26B is brought into contact with the lower surface of the hole H by the command measurement force. Under this condition, when the stylus-displacement detector 20 and the stage 10 are relatively moved in an axial direction (X-axis direction) of the hole H by the relative movement mechanism 40, the displacement detector 27 detects the circular movement amount of the measurement arm 24. A surface texture of the lower surface of the hole H is measured based on the circular movement amount.

Next, the controller 101 outputs an upward switching operation command and the measurement force command. Hereupon, the measurement arm 24 is operated at the predetermined speed in a direction by the measurement-arm attitude switching mechanism 60 to bias the end of the measurement arm 24 upward and the upward stylus 26A is brought into contact with the upper surface of the hole H by the command measurement force.

Under this condition, when the stylus-displacement detector 20 and the stage 10 are relatively moved in the axial direction (X-axis direction) of the hole by the relative movement mechanism 40, the displacement detector 27 detects the circular movement amount of the measurement arm 24. A surface texture of the upper surface of the hole H is measured based on the circular movement amount.

For Measurement of Thickness of Plate-like Workpiece

Figure 10:
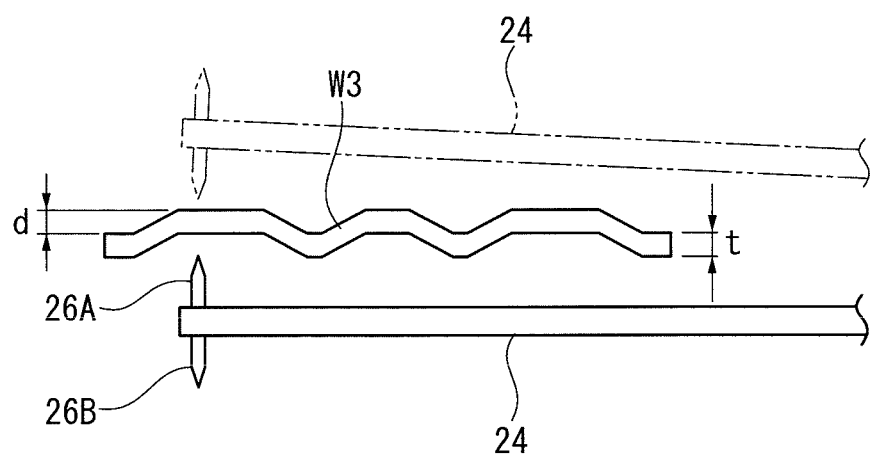
FIG. 10 shows an example of measurement of a thickness according to the exemplary embodiment.

For measuring a thickness of a plate-like object W3 as shown in FIG. 10, similarly, the controller 101 commands to drive the relative movement mechanism 40 and position the styluses 26A and 26B of the measurement arm 24 at a lower surface of the object W3 and then commands the measurement-arm attitude switching mechanism 60 to switch the attitude of the measurement arm 24 to bias the end of the measurement arm 24 in an upward direction of the circular movement, thereby bringing the upward stylus 26A into contact with the lower surface of the object. Under this condition, when the stylus-displacement detector 20 and the stage 10 are relatively moved in the X-axis direction by the relative movement mechanism 40, the displacement detector 27 detects the circular movement amount of the measurement arm 24. A surface texture of the lower surface of the object W3 is measured based on the circular movement amount.

Next, the controller 101 commands to drive the relative movement mechanism 40 and position the styluses 26A and 26B of the measurement arm 24 toward an upper surface of the object W3 and then commands the measurement-arm attitude switching mechanism 60 to switch the attitude of the measurement arm 24 to bias the end of the measurement arm 24 in a downward direction of the circular movement, thereby bringing the downward stylus 26B into contact with the upper surface of the object W3. Under this condition, when the stylus-displacement detector 20 and the stage 10 are relatively moved in the X-axis direction by the relative movement mechanism 40, the displacement detector 27 detects the circular movement amount of the measurement arm 24. A surface texture of the upper surface of the object W3 is measured based on the circular movement amount.

The thickness t and a distance d of the object W3 can be accurately measured based on the thus obtained surface texture of the lower and upper surfaces of the object W3.

Accordingly, since the pair of styluses 26A and 26B projecting in the circular movement directions are provided at the end of the measurement arm 24, the surface texture of the upper and lower surfaces of the hole H, the object W3 and the like can be measured by switching the biasing direction of the measurement arm 24 by the measurement-arm attitude switching mechanism 60, specifically, switching the attitude of the measurement arm 24 between one direction (the upward direction) of the circular movement directions of the measurement arm 24 to the other direction (the downward direction).

During the above measurement operation, when the measurement arm 24 is operated, for instance, when the end of the measurement arm 24 is switched from the downward direction to the upward direction, the measurement attitude/measuring force control circuit 70 controls the operation speed of the measurement arm 24 to be the predetermined speed.

In other words, when the measurement-arm attitude switching mechanism 60 switches the end of the measurement arm 24, for instance, to move from the downward direction to the upward direction, the displacement detector 27 outputs the pulse signals of the number corresponding to the circular movement amount of the measurement arm 24. Hereupon, the frequency/voltage converter 74 detects a voltage B corresponding to the operation speed of the measurement arm 24 based on the pulse signal from the displacement detector 27. A difference between the voltage B corresponding to the operation speed of the measurement arm 24 and the voltage A corresponding to the command speed signal outputted from the command signal generator 72 is obtained as the differential voltage C. Since the electric current passing through the voice coil 62 is controlled based on the differential voltage C, the switching operation speed of the measurement arm 24 can be kept according to the command speed signal outputted from the command signal generator 72.

Accordingly, since the operation speed of the measurement arm 24 can be kept at the predetermined speed or lower, impact can be suppressed when the styluses 26A and 26B collide with the inner surface of the hole H. Consequently, damage to the styluses 26A and 26B and the object W1 can be reduced.

Moreover, since the operation speed of the measurement arm 24 can be kept at any command speed, the operation speed of the measurement arm 24 can be set at a speed suitable for a material of the object and the like.

Furthermore, since the measurement attitude/measuring force control circuit 70 uses the circular movement amount of the measurement arm 24, specifically, the pulse signals from the displacement detector 27 detecting the displacement of the styluses 26A and 26B, a speed detector detecting the switching operation speed of the measurement arm 24 is not required, so that the measurement attitude/measuring force control circuit 70 can be manufactured at a low cost and in a compact size.

Effect in Measurement Operation

In the above measurement, since the displacement detector 27 of the stylus-displacement detector 20 includes the scale 27A and the detection head 27B and the detecting surface of the scale 27A is on the axis of the measurement arm 24 and on the plane of the circular movement of the measurement arm 24, errors caused by offset and the like can be reduced and a highly accurate measurement can be expected.

In the above measurement, when an external force larger than the attraction force of the magnet 95 acts on the styluses 26A and 26B and the measurement arm 24, the first plate 81 and the second plate 82 are disengaged. Accordingly, further external force does not act on the styluses 26A and 26B, the measurement arm 24 and an inner mechanism of the stylus-displacement detector 20 any more, so that damage to these components can be prevented.

Even when the first plate 81 and the second plate 82 are to be disengaged, the engagement pins 93 and 94 are caught in the engagement holes 91 and 92, so that the second measurement arm 24B is less likely to fall. Furthermore, even when the second measurement arm 24B is detached from the attachment-detachment mechanism 25 after external force acts on the measurement arm 24 and the styluses 26A and 26B, the second measurement arm 24B is less likely to fall since the attachment-detachment mechanism 25 is arranged in the casing 28. Accordingly, damage to the measurement arm 24 and the styluses 26A and 26B can be prevented.

Moreover, since the attachment-detachment mechanism 25 is arranged in the casing 28, the attachment-detachment mechanism 25 is not likely to collide with the object, so that the attachment-detachment mechanism 25 is less likely to be damaged by collision with the object and less likely to be dirty by external environments.

In this arrangement, driving of the relative movement mechanism 40 is stopped by the controller 101 serving as the drive stopper, when the contact detection circuit 100 detects the opening of any one of the seat sensors 97, 98 and 99. For instance, even when the second measurement arm 24B is detached from the attachment-detachment mechanism 25, the driving of the relative movement mechanism 40 is stopped, so that the measurement can safely be performed.

Exchange Operation of Second Measurement Arm

When exchanging the original second measurement arm 24B for a second measurement arm 24B having a different stylus depending on a measurement portion of the object, the second plate 82 with the original second measurement arm 24B is separated from the first plate 81 with the first measurement arm 24A by a force larger than the attraction force of the magnet 95, and the second plate 82 with the second measurement arm 24B having another stylus is arranged to face the first plate 81.

Hereupon, the magnetic material 96 becomes attracted by the magnet 95, whereby the second plate 82 becomes attracted by the first plate 81. At this operation, the engagement balls 88, 89 and 90 each are fit into a right position between the pair of cylindrical positioning members 84A and 84B of each of the seats 85, 86 and 87 while being guided by the pair of cylindrical positioning members 84A and 84B. Accordingly, without visual check, another second measurement arm 24B can be attached by a one-touch operation in which the second plate 82 is placed to face the first plate 81 such that the first plate 81 and the second plate 82 substantially coincide with each other.

Consequently, the measurement can be performed by exchange with a second measurement arm 24B having the most suitable stylus for a profile of the measurement portion of the object.

The engagement pins 93 and 94 on the first plate 81 are brought into engagement with the engagement holes 91 and 92 formed on the second plate 82. Since the projecting amount of each of the engagement pins 93 and 94 is set such that the magnetic material 96 is attracted by the magnet 95 after the engagement pins 93 and 94 start to be engaged with the engagement holes 91 and 92, even without visual check, it can be recognized by feeling through the attraction force of the magnet 95 that the second plate 82 is connected to the first plate 81 at a right position.

Since the contact detection circuit 100 can detect the opening/closing of the seat sensors 97, 98 and 99, it can be checked whether the second measurement arm 24B has been suitably exchanged.

Moreover, the attachment-detachment mechanism 25 is provided in the casing 28, in other words, the attachment-detachment mechanism 25 is closer to the rotary shaft 23 (fulcrum) of the measurement arm 24 as compared with an attachment-detachment mechanism 25 provided outside the casing 28. Accordingly, moment applied on the fulcrum can be reduced in the attachment/detachment of the second measurement arm 24B, so that load applied on a bearing of the fulcrum can be reduced and damage prevention effect to the bearing can be expected.

Under such a condition that the second plate 82 is attracted by the first plate 81, the third seat 87 restricts an axial displacement of the measurement arm 24 and the first and second seats 85 and 86 restrict a rotary displacement of the measurement arm 24 around the engagement ball 88 engaged with the first seat 85. Accordingly, the first and second plates 81 and 82 can accurately be positioned in a predetermined relation. Moreover, under such a condition, since the first seat 85 is spaced from the second seat 86 in the axial direction of the measurement arm 24, the measurement arm 24 can be held by a relatively compact arrangement and a small force. A longer distance between the first seat 85 and the second seat 86 is preferable. As in this exemplary embodiment, the first seat 85 and the second seat 86 are preferably arranged at both ends of the first plate 81 spaced from each other in the axial direction of the measurement art 24.

Figure 11:
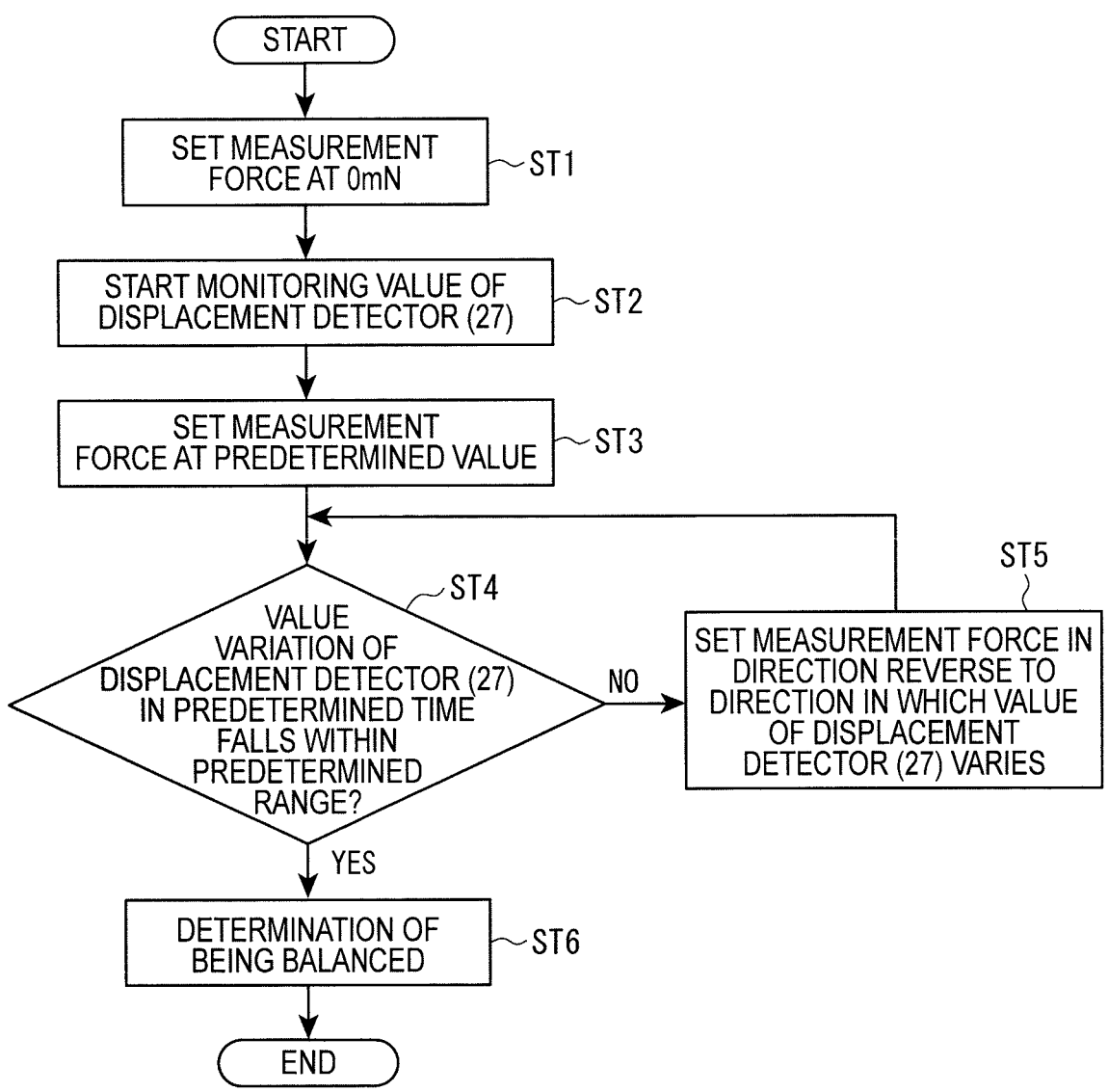
FIG. 11 is a flow chart showing a procedure of balance adjustment of the measurement arm according to the exemplary embodiment.

When the controller 101 outputs a balance command after the second measurement arm 24B is exchanged, processing is performed according to a flow chart shown in FIG. 11 to automatically adjust balance of the measurement arm 24.

Specifically, the controller 101 outputs a setting command to set a measurement force at 0 in step (hereinafter referred to as "ST") 1 and starts monitoring a value of the displacement detector 27 in ST2.

In ST3, the controller 101 outputs a setting command to set the measurement force at a predetermined value. In ST4, the controller 101 checks whether a value variation of the displacement detector 27 in a predetermined period of time falls within a predetermined range.

When the value variation of the displacement detector 27 in the predetermined period of time does not fall within the predetermined range in ST4, in other words, when the measurement arm 24 including the exchanged second measurement arm 24B is exceedingly off balance, the operation proceeds to ST5. In ST5, the controller 101 outputs a setting command to set the measurement force in a direction reverse to a direction in which the values of the displacement detector 27 vary. The processing of ST5 is repeated until the value variation of the displacement detector 27 in the predetermined period of time falls within the predetermined range.

When the value variation of the displacement detector 27 in a predetermined period of time falls within the predetermined range in ST4, the controller 101 determines in ST6 that the measurement arm 24 becomes in balance and terminates the processing.

The measurement force in the measurement is determined by defining a measurement force in good balance as 0 and adding a measurement force to be applied during the measurement.

Accordingly, the controller 101 serving as the balance adjuster can automatically adjust the balance of the measurement arm 24 by adjusting the electric current passing through the voice coil 62 even when a weight of the exchanged second measurement arm 24B after the exchange is different from a weight of the previous second measurement arm 24B. Consequently, a measurement error caused by the exchange with the second measurement arm 24B can be decreased and improvement in usability and an operational efficiency can be expected.

In particular, the balance adjustment of the measurement arm 24 can accurately be performed since the balance adjuster adjusts the electric current passing through the voice coil 62 while monitoring the circular movement amount of the measurement arm 24 detected by the displacement detector 27 and terminates the balance adjustment when the circular movement amount reaches the predetermined value.

Modification

The invention is not limited to the above-described exemplary embodiment but may include modification(s) and improvement(s) made within a scope where an object of the invention can be attained.

In the above exemplary embodiment, the first, second and third seats 85, 86 and 87 for the attachment-detachment mechanism 25 are provided on the first plate 81, and the engagement balls 88, 89 and 90 respectively engageable/disengageable to the first, second and third seats 85, 86 and 87 are provided on the second plate 82. However, the first, second and third seats 85, 86 and 87 may be provided on the second plate 82 and the engagement balls 88, 89 and 90 may be provided on the first plate 81. The magnet 95 is provided on first plate 81 and the magnetic material 96 is provided on the second plate 82. However, the magnet 95 may be provided on the second plate 82 and the magnetic material 96 may be provided on the first plate 81. The engagement pins 93 and 94 are provided on first plate 81 and the engagement halls 91 and 92 are provided on the second plate 82. However, the engagement pins 93 and 94 may be provided on the second plate 82 and the engagement halls 91 and 92 may be provided on the first plate 81.

In the above exemplary embodiment, the measurement-arm attitude switching mechanism 60 includes the voice coil 62 that biases the measurement arm 24 in the upward and downward directions of the circular movement around the rotary shaft 23. However, the arrangement of the measurement-arm attitude switching mechanism 60 is not limited thereto. For instance, the measurement-arm attitude switching mechanism 60 may include a linear motor mechanism.

Though the circular movement direction is the vertical direction in the above exemplary embodiment, but the circular movement direction may be a horizontal direction. Alternatively, the measurement arm 24 may swing in a diagonal direction other than the vertical and horizontal directions.

In the above exemplary embodiment, the second measurement arm 24B having the pair of the styluses 26A and 26B at the end of the measurement arm 24 is described. However, the second measurement arm 24B may not have a pair of styluses. Any arrangement of the second measurement arm 24B is possible as long as the measurement arm is exchangeable for a measurement arm having a suitable stylus for a measurement portion.

In the above exemplary embodiment, the method of adjusting the balance of the measurement arm 24 is described according to the procedure shown in the flow chart of FIG. 11. However, the balance of the measurement arm 24 may be adjusted according to the procedure shown in the flow chart of FIG. 12 or FIG. 13.

Figure 12:
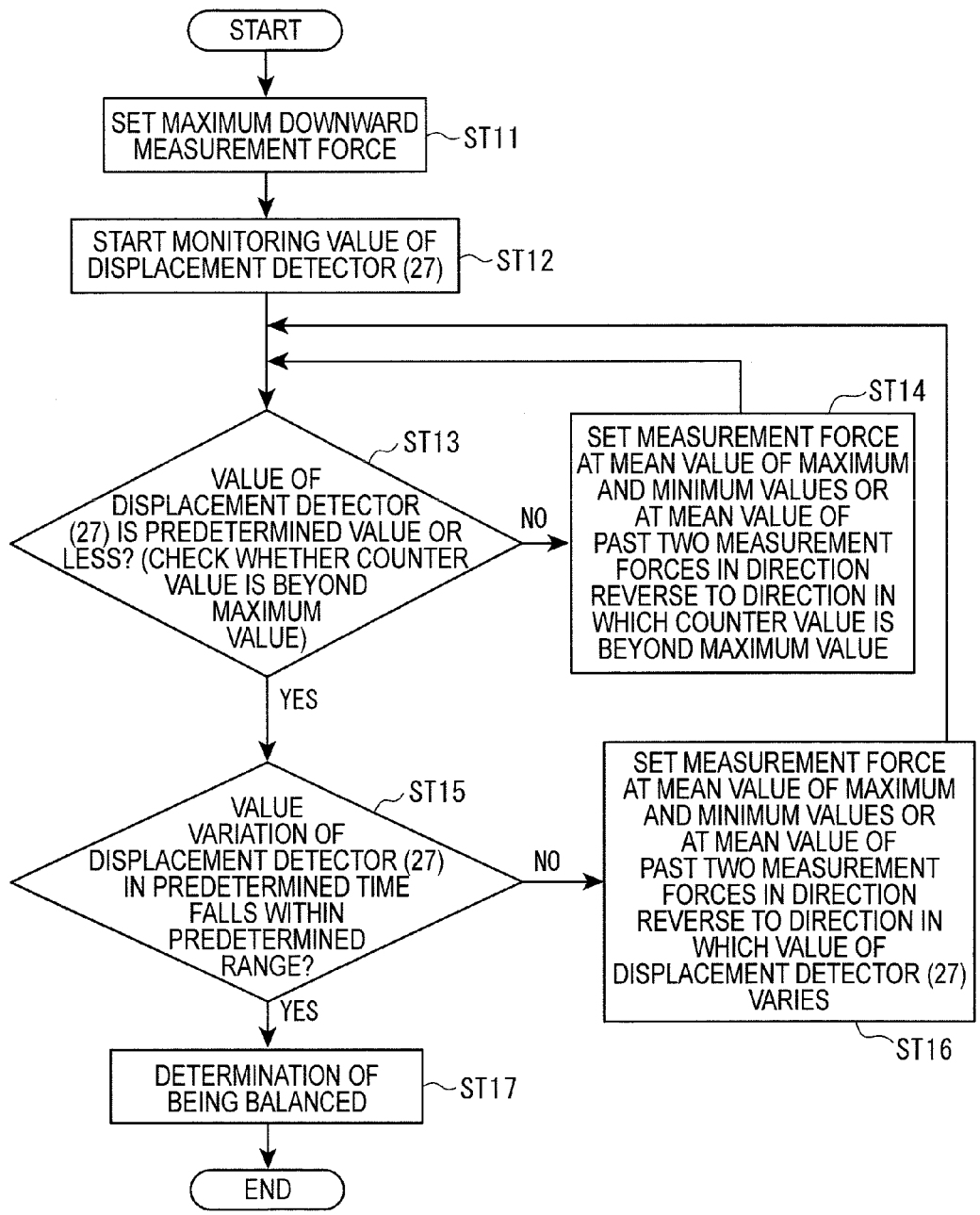
FIG. 12 is a flow chart showing another procedure of balance adjustment of the measurement arm according to the exemplary embodiment.
Figure 13:
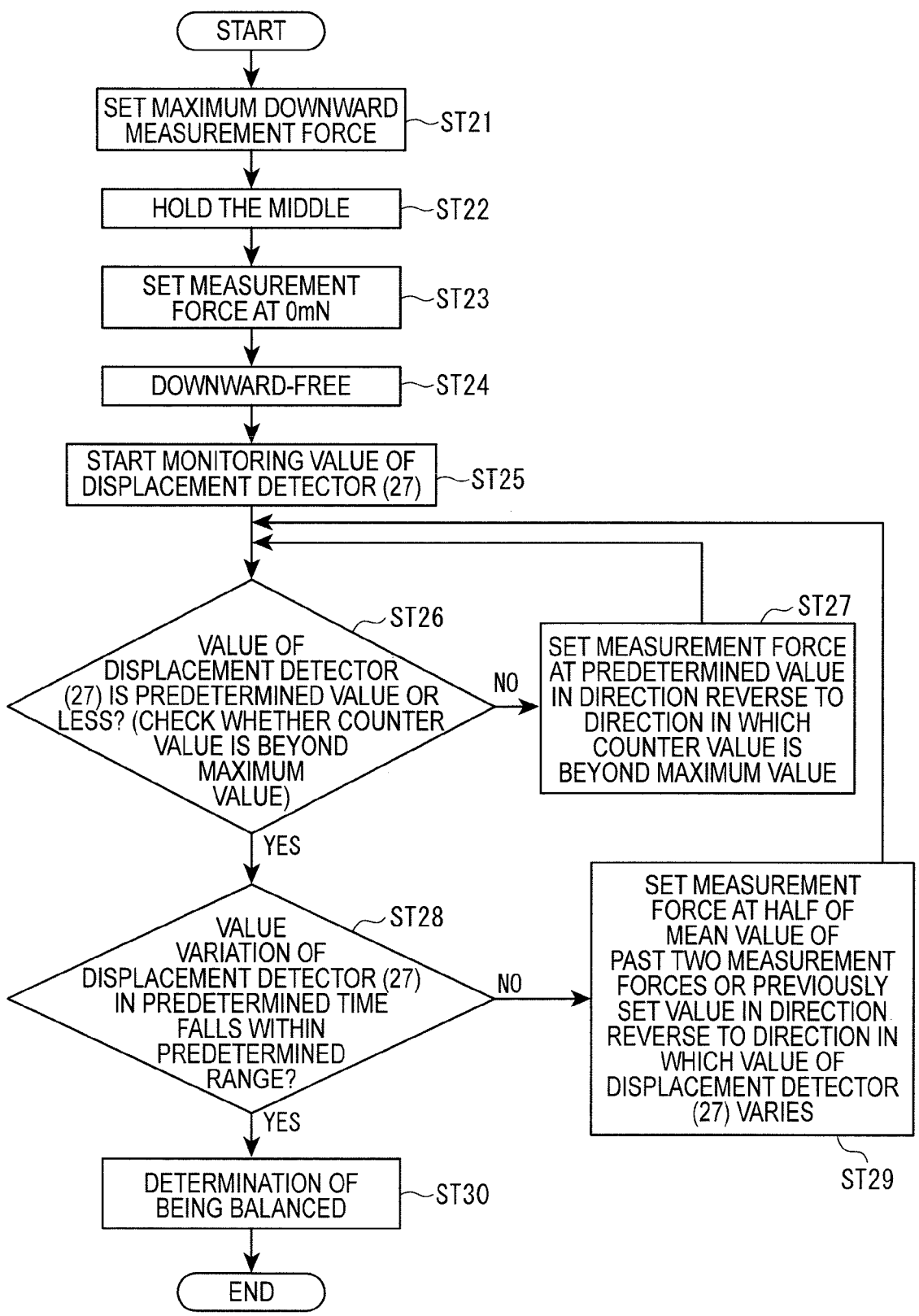
FIG. 13 is a flow chart showing still another procedure of balance adjustment of the measurement arm according to the exemplary embodiment.

In the procedure shown in the flow chart of FIG. 12, the controller 101 outputs a setting command to set a maximum downward measurement force in ST11 and starts monitoring a value of the displacement detector 27 in ST12.

In ST13, the controller 101 checks whether the value of the displacement detector 27 is equal to or less than a predetermined value, in other words, whether a counter value is beyond the maximum value.

When the value of the displacement detector 27 is not equal to or less than the predetermined value in ST13, the operation proceeds to ST14. In ST14, the controller 101 commands to set the measurement force at a mean value of the maximum value and the minimum value or at a mean value of the past two measurement forces in a direction reverse to the direction in which the counter value is beyond the maximum value. The processing of ST14 is repeated until the value of the displacement detector 27 becomes equal to or less than the predetermined value.

When the value of the displacement detector 27 is equal to or less than the predetermined value in ST13, the operation proceeds to ST15. In ST15, the controller 101 checks whether the value variation of the displacement detector 27 in a predetermined period of time falls within the predetermined range.

When the value variation of the displacement detector 27 in a predetermined period of time does not fall within the predetermined range in ST15, the operation proceeds to ST16. In ST16, the controller 101 commands to set the measurement force at the mean value of the maximum value and the minimum value or at the mean value of the past two measurement forces in a direction reverse to the direction in which the value of the displacement detector 27 varies, and the processing returns to ST13.

When the value variation of the displacement detector 27 in the predetermined period of time falls within the predetermined range in ST15, the controller 101 determines in ST17 that the measurement arm 24 becomes in balance and terminates the processing. In the procedure shown in the flow chart of FIG. 13, the controller 101 outputs a setting command to set a maximum downward measurement force in ST21 and the measurement arm 24 is held at the middle position from the position of the maximum downward measurement force in ST22.

In ST23, the controller 101 outputs the setting command to set the measurement force at 0. In ST24, the measurement arm 24 is allowed to move downward. In ST25, the controller 101 starts monitoring the value of the displacement detector 27.

In ST26, the controller 101 checks whether the value of the displacement detector 27 is equal to or less than the predetermined value, in other words, whether a counter value is beyond the maximum value or not.

When the value of the displacement detector 27 is not equal to or less than the predetermined value in ST26, the operation proceeds to ST27. In ST27, the controller 101 commands to set the measurement force of a predetermined value in a direction reverse to the direction in which the counter value is beyond the maximum value. The processing of ST27 is repeated until the value of the displacement detector 27 becomes equal to or less than the predetermined value in ST26.

When the value of the displacement detector 27 is equal to or less than the predetermined value in ST26, the operation proceeds to ST28. In ST28, the controller 101 checks whether a value variation of the displacement detector 27 in the predetermined period of time falls within the predetermined range.

When the value variation of the displacement detector 27 in the predetermined period of time does not fall within the predetermined range in ST28, the operation proceeds to ST29. In ST29, the controller 101 commands to set the measurement force at a half of the mean value of the past two measurement forces or a measurement force of the previously set measurement force in a direction reverse to the direction in which the value of the displacement detector 27 varies, and the processing returns to ST26.

When the value variation of the displacement detector 27 in the predetermined period of time falls within the predetermined range in ST28, the controller 101 determines in ST30 that the measurement arm 24 becomes in balance and terminates the processing.

In the above exemplary embodiment, the measurement attitude/measuring force control circuit 70 is arranged as shown in FIG. 5. However, the arrangement of the measurement attitude/measuring force control circuit 70 is not limited thereto. For instance, the measurement attitude/measuring force control circuit 70 may be a circuit as shown in FIG. 14.

Figure 14:
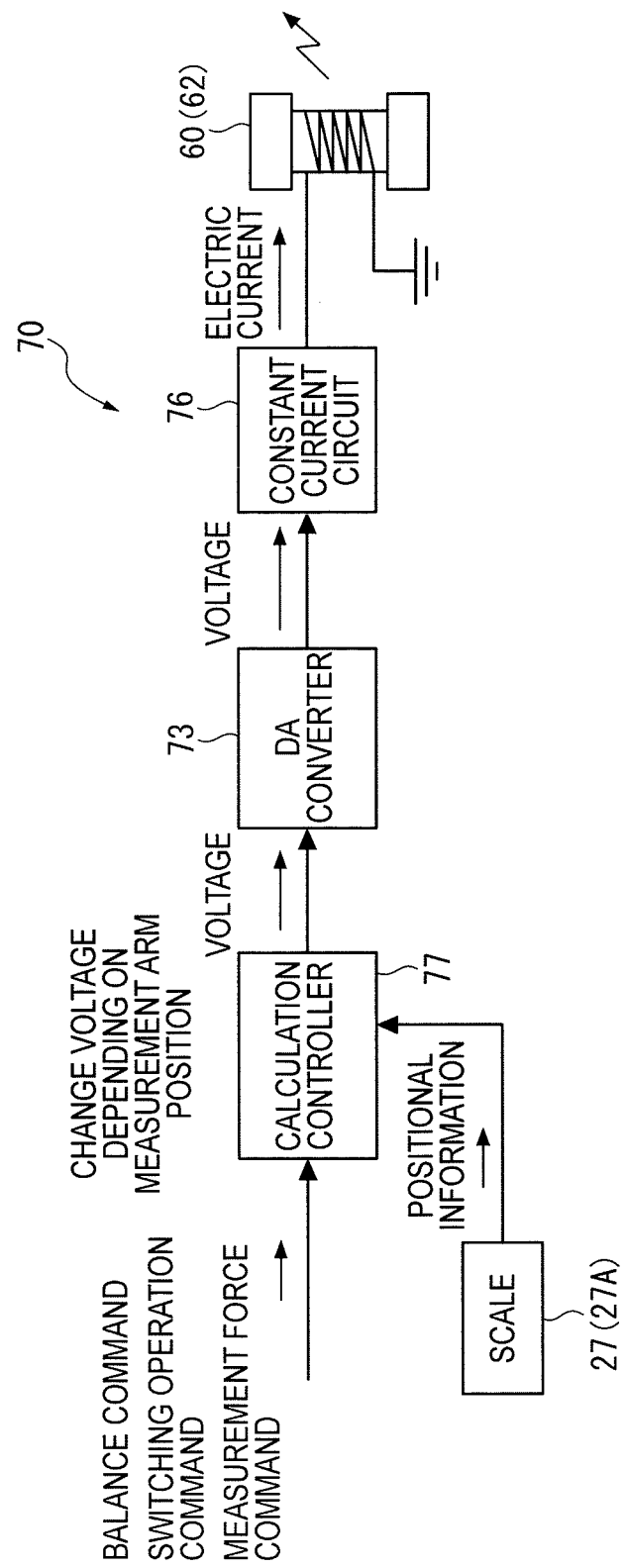
FIG. 14 shows a modification of measurement attitude/measuring force control circuit according to the exemplary embodiment.

The measurement attitude/measuring force control circuit 70 shown in FIG. 14 includes a calculation controller 77 that calculates the switching operation speed of the measurement arm 24 based on the pulse signals (positional information) from the displacement detector 27 and generates a voltage (a control signal) such that the calculated switching operation speed conform with the predetermined command speed; a digital/analog converter 73 that converts the voltage (the control signal) from the calculation controller 77 into an analog signal; and a constant current circuit 76 that generates electric current passing through the voice coil 62 based on the output from the digital/analog converter 73.

With this arrangement, when the measurement-arm attitude switching mechanism 60 switches the measurement arm 24 from one direction to the other direction of the swinging directions, the pulse signals (positional information) of the number corresponding to the circular movement amount of the measurement arm 24 is outputted. While counting time elapsed from start of the movement, the calculation controller 77 calculates an operation speed of a currently used measurement arm 24 based on the elapsed time and the pulse signal (positional information) from the displacement detector 27, compares the calculated operation speed with the command speed corresponding to the operation command given by the controller 101, and generates the voltage (the control signal) such that the operation speed conforms with the command speed. As a result, since the constant current circuit 76 generates the electric current to pass through the voice coil 62 based on the control signal generated from the calculation controller 77, the operation speed of the measurement arm 24 can be kept at the command speed. Accordingly, the same advantages as those in the above exemplary embodiment can be expected.

The relative movement mechanism 40 enables the stage 10 to move in the Y-axis direction and the stylus-displacement detector 20 to move in the X-axis direction and the Z-axis direction, the invention is not limited thereto. In other words, as long as the stage 10 and the stylus-displacement detector 20 are movable in the three dimensional directions, any one or both of the stage 10 and the stylus-displacement detector 20 may be movable.

What is claimed is:
1. A surface texture measuring instrument comprising:
a measurement arm that is supported by a body movably in a circular movement around a rotary shaft;
a stylus provided at an end of the measurement arm;
a displacement detector that detects a circular movement amount of the measurement arm;
a detector having a casing that houses the body;
a stage on which an object to be measured is mounted; and
a relative movement mechanism that moves the detector and the stage relatively to each other, the surface texture measuring instrument being configured to detect the circular movement amount of the measurement arm by the displacement detector while moving the detector and the stage relatively to each other by the relative movement mechanism with the stylus being in contact with a surface of the object and to measure a surface texture of the object based on the circular movement amount, wherein the measurement arm comprises: a first measurement arm that is supported by the body swingably around the support shaft in the casing; and a second measurement arm that is provided with the stylus at an end thereof and is detachably provided to an end of the first measurement arm via an attachment-detachment mechanism, the attachment-detachment mechanism being arranged in the casing, the displacement detector comprises: a scale that is provided to one of the body and the measurement arm; and a detection head that is provided to the other of the body and the measurement arm to face the scale, and a detecting surface of the scale is on an axis of the measurement arm and on a plane of the circular movement of the measurement arm.

2. The surface texture measuring instrument according to claim 1, wherein the attachment-detachment mechanism comprises: a first plate that is attached to the end of the first measurement arm; a second plate that is attached to a base end of the second measurement arm; a positioning mechanism that positions the second plate at a predetermined position relative to the first plate when placing the second plate to face the first plate; a magnet provided on one of the first plate and the second plate; and a magnetic material that is provided on the other of the first plate and the second plate and is attracted by the magnet, the positioning mechanism comprises: a first seat comprising a pair of cylindrical positioning members that are arranged in parallel to an axial direction of the measurement arm and are spaced from each other at a predetermined interval; a second seat comprising a pair of cylindrical positioning members that are arranged in parallel to the axial direction of the measurement arm and are spaced from the first seat in the axial direction of the measurement arm; a third seat comprising a pair of cylindrical positioning members that are perpendicular to the axial direction of the measurement arm and are spaced from each other at a predetermined interval; and engagement balls that respectively correspond to the first seat, the second seat and the third seat to be engageable with and disengageable from the first seat, the second seat and the third seat, and the first seat, the second seat and the third seat are provided on one of the first plate and the second plate and the engagement balls are provided on the other of the first plate and the second plate.

3. The surface texture measuring instrument according to claim 2, wherein the positioning mechanism comprises: at least two engagement holes formed on one of the first plate and the second plate; and at least two engagement pins provided on the other of the first plate and the second plate to be engaged with the engagement holes.

4. The surface texture measuring instrument according to claim 3, wherein a projecting amount of each of the engagement pins is set such that the magnetic material is attracted by the magnet after the engagement pins start to be engaged with the engagement holes.

5. The surface texture measuring instrument according to claim 2, wherein the pairs of cylindrical positioning members for the first, second and third seats and the engagement balls are formed of a conductive material and provide seat sensors that are closed when the pairs of cylindrical positioning members are respectively in contact with the engagement balls engageable and disengageable thereto and are opened when the pairs of cylindrical positioning members are respectively separated from the engagement balls, and a contact detection circuit that detects opening and closing of the seat sensors is provided.

6. The surface texture measuring instrument according to claim 5, further comprising:

a drive stopper that stops driving the relative movement mechanism when the contact detection circuit detects opening of any one of the seat sensors.

7. A surface texture measuring instrument comprising:

a measurement arm that is supported by a body movably in a circular movement around a rotary shaft;

a stylus provided at an end of the measurement arm;

a displacement detector that detects a circular movement amount of the measurement arm;

a detector having a measurement force applier that applies a measurement force to the stylus by biasing the measurement arm in circular movement directions;

a stage on which an object to be measured is mounted; and a relative movement mechanism that moves the detector and the stage relatively to each other, the surface texture measuring instrument being configured to detect the circular movement amount of the measurement arm by the displacement detector while moving the detector and the stage relatively to each other by the relative movement mechanism with the stylus being in contact with a surface of the object and to measure a surface texture of the object based on the circular movement amount, wherein the measurement arm comprises: a first measurement arm that is supported by the body movably in the circular movement around the support shaft; and a second measurement arm that is provided with the stylus at an end thereof and is detachably provided to an end of the first measurement arm via an attachment-detachment mechanism, the measurement force applier comprises a voice coil that biases the measurement arm in the circular movement directions around the support shaft, and a balance adjuster that adjusts electric current passing through the voice coil to adjust balance of the measurement arm, after the second measurement arm is exchanged.

8. The surface texture measuring instrument according to claim 7, wherein the balance adjuster adjusts the electric current passing through the voice coil while monitoring the circular movement amount of the measurement arm detected by the displacement detector and terminates the balance adjustment when the circular movement amount of the measurement arm reaches a predetermined value.

9. The surface texture measuring instrument according to claim 7, wherein the stylus comprises a pair of styluses projecting from the end of the measurement arm in the circular movement directions, and the voice coil configures a measurement-arm attitude switching mechanism that switches an attitude of the measurement arm between a first attitude where the measurement arm is biased in one direction of the circular movement directions and a second attitude where the measurement arm is biased in the other direction of the circular movement directions.

10. The surface texture measuring instrument according to claim 9, further comprising:

a speed control mechanism that controls a switching operation speed of the measurement arm to be a predetermined speed when the measurement-arm attitude switching mechanism switches the attitude of the measurement arm.

\* \* \* \* \*